US008385870B2

(12) United States Patent
Lee et al.

(10) Patent No.: US 8,385,870 B2
(45) Date of Patent: Feb. 26, 2013

(54) METHOD OF CONTROLLING ANTENNA OF MOVING OBJECT AND SYSTEM USING THE SAME

(75) Inventors: In Sun Lee, Seoul (KR); Kyung Hun Jang, Suwon-si (KR); Hyo Sun Hwang, Seoul (KR); Hyun Ho Choi, Daejeon (KR); Tae In Hyon, Hwaseong-si (KR); Young Soo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1119 days.

(21) Appl. No.: 11/876,227

(22) Filed: Oct. 22, 2007

(65) Prior Publication Data

US 2009/0021434 A1 Jan. 22, 2009

(30) Foreign Application Priority Data

Jul. 18, 2007 (KR) ........................ 10-2007-0071940

(51) Int. Cl.
*H04B 1/06* (2006.01)

(52) U.S. Cl. ..................................... 455/272; 455/226.1

(58) Field of Classification Search .... 455/226.1–226.4, 455/269–279.1, 562.1, 575.7, 97, 129, 276.1–277.1
See application file for complete search history.

(56) References Cited

U.S. PATENT DOCUMENTS

| | | | | |
|---|---|---|---|---|
| 7,050,776 | B2 * | 5/2006 | Kim et al. | 455/277.1 |
| 7,460,466 | B2 * | 12/2008 | Lee et al. | 455/452.1 |
| 7,764,711 | B2 * | 7/2010 | Sudo | 455/272 |
| 7,826,346 | B2 * | 11/2010 | Seki et al. | 455/513 |
| 8,261,150 | B2 * | 9/2012 | Murakami et al. | 375/267 |
| 2003/0064729 | A1 * | 4/2003 | Yamashita | 455/451 |
| 2006/0182201 | A1 | 8/2006 | Lindenmeier et al. | |
| 2008/0171516 | A1 * | 7/2008 | Kakura | 455/63.4 |

FOREIGN PATENT DOCUMENTS

| | | | |
|---|---|---|---|
| JP | 6-165060 | | 6/1994 |
| JP | 2003070055 | * | 3/2003 |
| JP | 2003-101461 | | 4/2003 |
| JP | 2006-261814 | | 9/2006 |
| JP | 2006261814 | * | 9/2006 |
| KR | 1020040051904 | * | 12/2002 |
| KR | 2004-51904 | | 6/2004 |
| KR | 2006-5083 | | 1/2006 |
| WO | WO 0191332 A1 | * | 11/2001 |

* cited by examiner

*Primary Examiner* — Lana N Le

(74) *Attorney, Agent, or Firm* — NSIP Law

(57) ABSTRACT

A system of controlling an antenna of a moving object is provided. The system includes: a plurality of communication antennas established in the moving object; an environmental information generation unit generating environmental information which includes strength information of a received signal and moving speed information of the moving object; an antenna use determination unit determining, with respect to the plurality of communication antennas, a number of antennas for each use based on the environmental information; and an antenna assigning unit assigning the plurality of communication antennas for each use according to the determined number of antennas.

16 Claims, 5 Drawing Sheets

METHOD OF CONTROLLING ANTENNA OF MOVING OBJECT AND SYSTEM USING THE SAME

CROSS-REFERENCE TO RELATED APPLICATION

This application claims the benefit of Korean Patent Application No. 2007-0071940, filed on Jul. 18, 2007 in the Korean Intellectual Property Office, the disclosure of which is incorporated herein by reference.

BACKGROUND OF THE INVENTION

1. Field of the Invention

The following description relates to a system and Method of controlling an antenna, and more particularly, to a system and method of controlling a plurality of antennas established in a moving object.

2. Description of the Related Art

Users increasingly require a greater variety of mobile communication services, such as a location based service (LBS), that can be provided in a moving motor vehicle. As an example, users require multimedia services such as viewing movies and listening to music via the Internet while they are moving in the motor vehicle.

To provide a greater variety of multimedia services and to provide a high quality wireless communication service in a real time, a high data transmission rate is required. Accordingly, researches on a multiple-input multiple-output (MIMO) technique, an orthogonal frequency division multiplexing (OFDM) technique, and the like, are being actively conducted to achieve even higher data transmission rates.

Also, as frequency resources are currently exhausted, various researchers and studies regarding how to effectively utilize the frequency resources are being conducted. A cognitive radio (CR) technique is considered as one promising technique.

The cognitive radio technique effectively uses frequency bands by recycling limited frequency resources. That is, the cognitive radio technology senses a frequency band which is not in use, and transmits/receives various data using the frequency band not in use. While studies and researches regarding the cognitive radio technique have been vigorously pursued, studies regarding how to employ the cognitive radio technique to a moving object, such as a motor vehicle, is so far inadequate.

Conventionally, a plurality of antennas are established in a moving object, and each of the plurality of antennas has its own function. As an example, when three antennas are established in a motor vehicle, each of the three antennas has its own use, that is a use as a receiving antenna of a television (TV), a use as an LBS antenna, and a use as a receiving antenna of a radio, and the uses of the three antennas are fixed. Since each use of the three antennas is fixed, when speed of the motor vehicle is increased or the motor vehicle is away from a base station, strength of a signal is decreased. Therefore, it is difficult to provide a user with suitable services due to surrounding environments.

Thus, a new system and method which can provide an improved quality communication service in a moving object by appropriately controlling a number of antennas according to surrounding environments of the moving object, is required.

SUMMARY OF THE INVENTION

General aspects of examples described herein provide a system and method of controlling an antenna of a moving object which can effectively communicate since a number of antennas is determined for each use by considering strength information of a received signal and moving speed information of the moving object.

General aspects of examples described herein also provide a system and method of controlling an antenna of a moving object which can effectively detect a frequency band by controlling a number of sensing antennas according to strength of a received signal.

General aspects of examples described herein also provide a system and method of controlling an antenna of a moving object which can achieve a higher data transmission rate in the moving object moving at a high speed since a number of data antennas is determined by considering moving speed information of the moving object.

General aspects of examples described herein also provide a system and method of controlling an antenna of a moving object which can provide an improved quality communication service using a data antenna being capable of transmitting/receiving data by using a multiple-input multiple-output (MIMO) system.

General aspects of examples described herein also provide a system and method of controlling an antenna of a moving object which can effectively control a data channel by determining a number of control antennas depending on surrounding environments.

General aspects of examples described herein also provide a system and method of controlling an antenna of a moving object which can provide a more convenient communication service by determining a number of moving object communication antennas for communication between moving objects depending on surrounding environments of the moving object.

According to a general aspect, there is provided a system of controlling an antenna of a moving object including: a plurality of communication antennas established in the moving object; an environmental information generation unit generating environmental information which includes strength information of a received signal and moving speed information of the moving object; an antenna use determination unit determining, with respect to the plurality of communication antennas, a number of antennas for each use based on the environmental information; and an antenna assigning unit assigning the plurality of communication antennas for each use according to the determined number of antennas.

In this instance, the antenna use determination unit may include: a sensing antenna determination unit determining a number of sensing antennas which detects an available frequency band from the plurality of communication antennas based on the strength information; and a data antenna determination unit determining a number of data antennas which transmits/receives data from the plurality of communication antennas by considering the moving speed information.

According to another aspect, there is provided a method of controlling an antenna of a moving object including: generating environmental information which includes strength information of a received signal and moving speed information of the moving object, in which a plurality of communication antennas are established; determining, with respect to the plurality of the communication antennas, a number of communication antennas for each use based on the environmental information; and assigning the plurality of communication antennas to each use according to the determined number of antennas.

In this instance, the determining of the number of communication antennas for each use may include: determining a number of sensing antennas which detects an available frequency band from the plurality of communication antennas based on the strength information; and determining a number of data antennas which transmits/receives data from the plurality of communication antennas according to the moving speed information.

Additional aspects and/or features will be set forth in part in the description which follows and, in part, will be obvious from the description, or may be learned by practice of examples described herein.

BRIEF DESCRIPTION OF THE DRAWINGS

These and/or other aspects and features will become apparent and more readily appreciated from the following description, taken in conjunction with the accompanying drawings of which.

DETAILED DESCRIPTION

Figure 1:
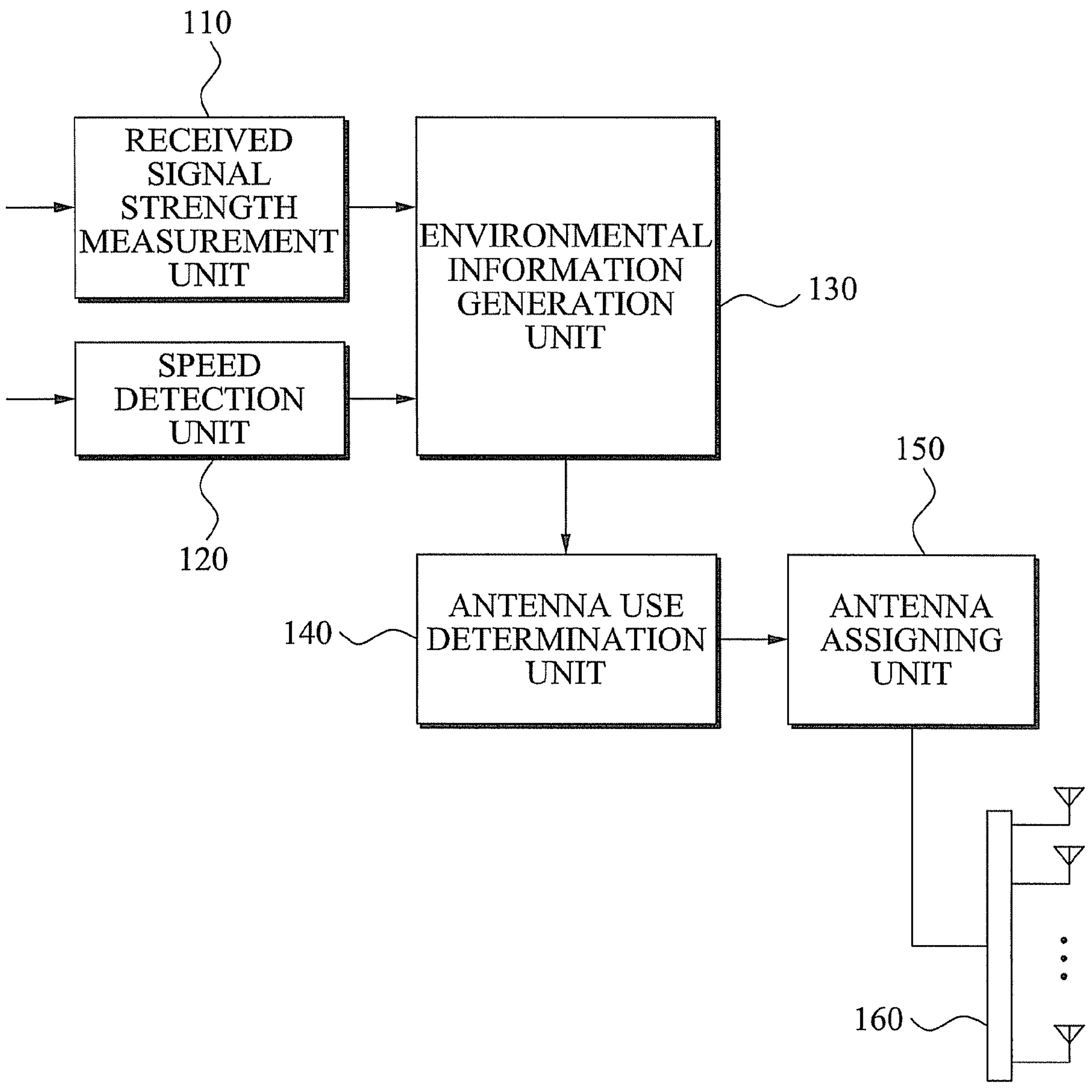
FIG. 1 is a block diagram illustrating an example of a system of controlling an antenna of a moving object.

Reference will now be made in detail to examples which are illustrated in the accompanying drawings, wherein like reference numerals refer to the like elements throughout. The examples are described below by referring to the figures.

FIG. 1 is a block diagram illustrating an example of a system of controlling an antenna of a moving object.

Referring to FIG. 1, an example of the system of controlling the antenna of the moving object includes a received signal strength measurement unit 110, a speed detection unit 120, an environmental information generation unit 130, an antenna use determination unit 140, an antenna assigning unit 150, and a plurality of communication antennas 160.

A plurality of communication antennas may be established in a moving object, which includes a motor vehicle, a vessel, and an airplane, to provide various communication services. Also, the moving object may transmit/receive data with a base station or a satellite, and communicate with other moving objects.

The received signal strength measurement unit 110 measures strength of a signal received in the moving object. There may be many types of scales indicating strength of the received signal. Specifically, power of the received signal and a signal to noise ratio (SNR) of the received signal may be included in such scales.

The moving object may move to various areas at various speeds. In this instance, the strength of the received signal in the moving object may differ depending on environments where the moving object exists. As an example, the moving object may pass though an underground tunnel at high speed, and may move along an outer communication boundary of a base station. When the moving object is in the underground tunnel or moves along the outer communication boundary of the base station, strength of a received signal may be decreased.

The speed detection unit 120 detects moving speed of the moving object. As an example, in the case of a motor vehicle, the speed detection unit 120 may detect moving speed information of the motor vehicle from a speedometer.

The environmental information generation unit 130 generates environmental information including strength information of the received signal and moving speed information of the moving object. In this instance, the environmental information further includes quality of service (QoS) information. The QoS information is about a network service standard, which is required to be satisfied to guarantee a sufficient service standard.

The environmental information generation unit 130 receives the strength information of the received signal from the received signal strength measurement unit 110 and the moving speed information of the moving object from the speed detection unit 120. The QoS information may be predetermined information depending on a utilized communication service.

The antenna use determination unit 140 determines, with respect to a plurality of communication antennas, a number of antennas for each use based on the environmental information.

The moving object may be provided with various communication services. As an example, a motor vehicle may be provided with a wireless Internet service, a location based service (LBS), a communication service between motor vehicles, and the like. The moving object may be provided with a communication service using a cognitive radio technique. Also, the moving object may communicate at a higher data transmission rate by using a multiple-input multiple-output (MIMO) technique.

In this instance, a plurality of communication antennas may be established in the moving object where various communication services are provided. All the plurality of communication antennas may be used for a same purpose, and each of the communication antennas in the plurality of communication antennas may be used for a different purpose. As an example, a certain communication antenna may be used for data transmission/reception, and another communication antenna may be used to detect an available frequency band that can be used in the cognitive radio technique.

In this instance, the antenna use determination unit 140 may identify strength of the received signal and moving speed of the moving object, based on the strength information of the received signal and the moving speed information which are included in the environmental information. Accordingly, the antenna use determination unit 140 determines the number of antennas for each use according to the strength of the received signal and the moving speed of the moving object.

In this instance, though it is not illustrated in FIG. 1, the antenna use determination unit 140 may include a sensing antenna determination unit and a data antenna determination unit, the sensing antenna determination unit determining a number of sensing antennas which detects an available frequency band from the plurality of communication antennas based on the strength information, and the data antenna determination unit determining a number of data antennas which transmits/receives data from the plurality of communication antennas by considering the moving speed information. Also, the antenna use determination unit 140 may include a control antenna determination unit which determines a number of control antennas which transmits/receives control information to control a data channel from the plurality of communication antennas, based on the environmental information. Also, the antenna use determination unit 140 may further include a moving object communication antenna determination unit which determines a number of moving object communication antennas for communication between moving objects from the plurality of communication antennas based on the environmental information.

Descriptions regarding the sensing antenna determination unit, the data antenna determination unit, the control antenna determination unit, and the moving object communication antenna determination unit will be described by referring to FIGS. 2 through 4.

Also, the antenna assigning unit 150 assigns the plurality of communication antennas to each use according to the determined number of antennas.

As an example, when a number of communication antennas is ten, the antenna use determination unit 140 may determine a number of sensing antennas to be four and a number of data antennas to be six, according to the environmental information. In this instance, from ten communication antennas, the antenna assigning unit 150 assigns four communication antennas for sensing antennas and six communication antennas for data antennas according to the determined number of antennas.

The antenna assigning unit 150 may assign the plurality of communication antennas according to a predetermined priority order when a sum of the number of sensing antenna and the number of data antenna exceeds a number of communication antennas.

In various examples, the antenna use determination unit 140 may independently determine a number of sensing antennas and a number of data antennas based on the environmental information, without considering a number of a plurality of communication antennas. As an example, when a number of communication antennas is ten, the antenna use determination unit 140 may determine six communication antennas for a number of sensing antennas and eight communication antennas for a number of data antennas. In this instance, the antenna assigning unit 150 may not assign six communication antennas for the number of the sensing antenna and eight communication antennas for the number of the data antenna since the number of the communication antenna is only ten. The antenna assigning unit 150 may assign the ten communication antennas for each use by considering the predetermined priority order. When priority for the data antenna is higher than priority for the sensing antenna, the antenna assigning unit 150 may assign eight communication antennas for the data antenna, and two communication antennas for the sensing antennas.

In this instance, the antenna assigning unit 150 may assign the plurality of communication antennas according to a number of a communication antenna, that is, a number of sensing antennas, a number of data antennas, and a number of control antennas, and a moving object communication antenna.

Also, the plurality of communication antennas 160 are established in the moving object such as a motor vehicle, an airplane, a sea vessel, and the like.

Figure 2:
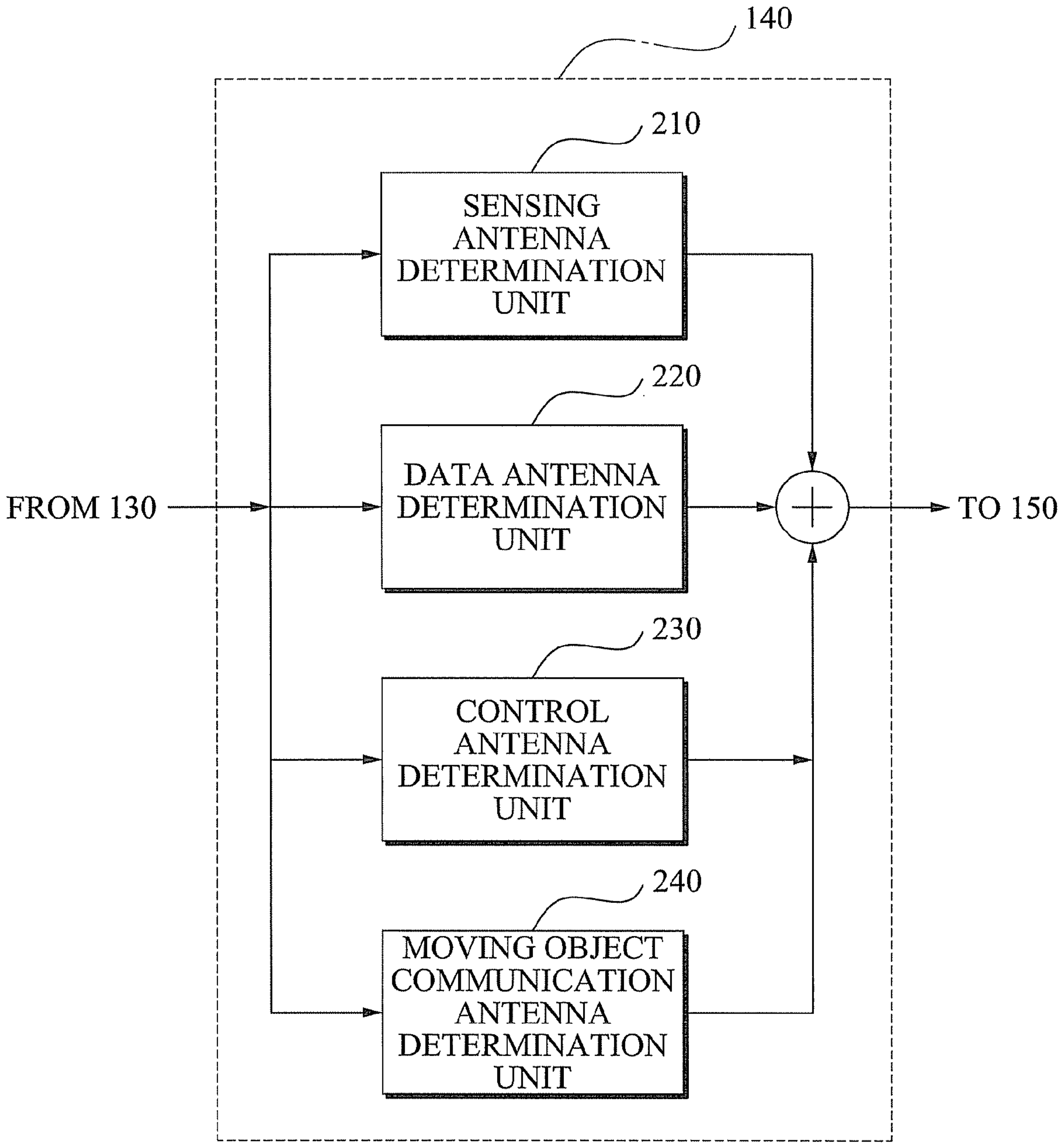
FIG. 2 is a block diagram illustrating an example of an antenna use determination unit of FIG. 1.

FIG. 2 is a block diagram illustrating an example of the antenna use determination unit 140 of FIG. 1.

Referring to FIG. 2, the antenna use determination unit 140 includes a sensing antenna determination unit 210, a data antenna determination unit 220, a control antenna determination unit 230, and a moving object communication antenna determination unit 240.

The sensing antenna determination unit 210 determines a number of sensing antennas which detects an available frequency band from a plurality of communication antennas based on strength information of a received signal.

It is required to detect the available frequency band when using a cognitive radio technique. That is, the available frequency band is required to be detected by variously scanning the determined frequency band. In this instance, a sensing antenna may be used to detect the available frequency band.

There are various methods in detecting the available frequency band by using the sensing antenna. There is a method of detecting an available frequency band by scanning a frequency band, which is determined for each sensing antenna. Also, there is a method of detecting an available frequency band by scanning for a primary user for each sensing antenna.

In this instance, the sensing antenna determination unit 210 may increase a number of sensing antennas as strength of a received signal is decreased.

As an example, when a motor vehicle including a plurality of communication antennas moves to an outer communication boundary of a cell of a base station, a moving object may receive a signal whose strength is weak. In this case, it may take a great time to detect an available frequency band, and an erroneous detection result may be caused when the moving object receives the signal whose strength is weak. In an example implementation, the sensing antenna determination unit 210 may increase a number of sensing antennas in order to rapidly and precisely detect an available frequency band.

Conversely, when strength of the received signal is sufficiently strong, the sensing antenna determination unit 210 may decrease a number of the sensing antennas.

Also, the data antenna determination unit 220 determines a number of data antennas which transmits/receives data from a plurality of communication antennas by considering moving speed information of a moving object. In this instance, the data antenna determination unit 220 may increase the number of data antennas as moving speed of the moving object is increased.

When the moving object moves, a channel state formed between the moving object and a base station or a channel state formed between the moving object and another moving object is generally deteriorated. As moving speed of the moving object is increased, a channel state is deteriorated, thereby decreasing a quality of data communication. In this instance, the data antenna determination unit 220 may increase the number of the data antenna to achieve a higher data transmission rate.

In this instance, the data antenna may transmit/receive data using a multiple-input multiple-output (MIMO) system. That is, a diversity gain may be obtained by transmitting/receiving data using the MIMO system, thereby achieving a higher data transmission rate.

Also, the control antenna determination unit 230 determines, based on environmental information, a number of control antennas transmitting/receiving control information to control a data channel from the plurality of communication antennas. In this instance, the control antenna may transmit/receive control information using the MIMO system.

Various information may be included in the control information. Specifically, the control information may include information about user authentication, a format of data, modulation/demodulation of data, and the like.

It is assumed that a data channel state is not poor as a result of analyzing environmental information, however when a channel state where the control information is transmitted is determined to be poor, the control antenna determination unit 230 may increase the number of control antennas.

Also, the moving object communication antenna determination unit 240 determines a number of a moving object communication antennas for communication between moving objects from the plurality of communication antennas based on the environmental information.

That is, a moving object communication antenna may be established in a predetermined moving object to directly communicate with another moving object. Specifically, a moving object may correspond to a single node of a plurality of nodes on a wireless network. As an example, each moving object may correspond to a single node which configures an ad-hoc network.

A moving object where a moving object communication antenna is established may search for another moving object using various methods. As an example, it is assumed that moving object A communicates with moving object B. In this instance, moving object A may broadcast or multicast a search packet for the moving object to adjacent moving objects via a moving object communication antenna. In this instance, the adjacent moving objects repeatedly broadcast or multicast the search packet, thereby searching for moving object B. When moving object B is discovered, there may be various data paths between moving object A and moving object B, however an optimized data path can be ascertained using an example of the moving object communication antenna.

Figure 3:
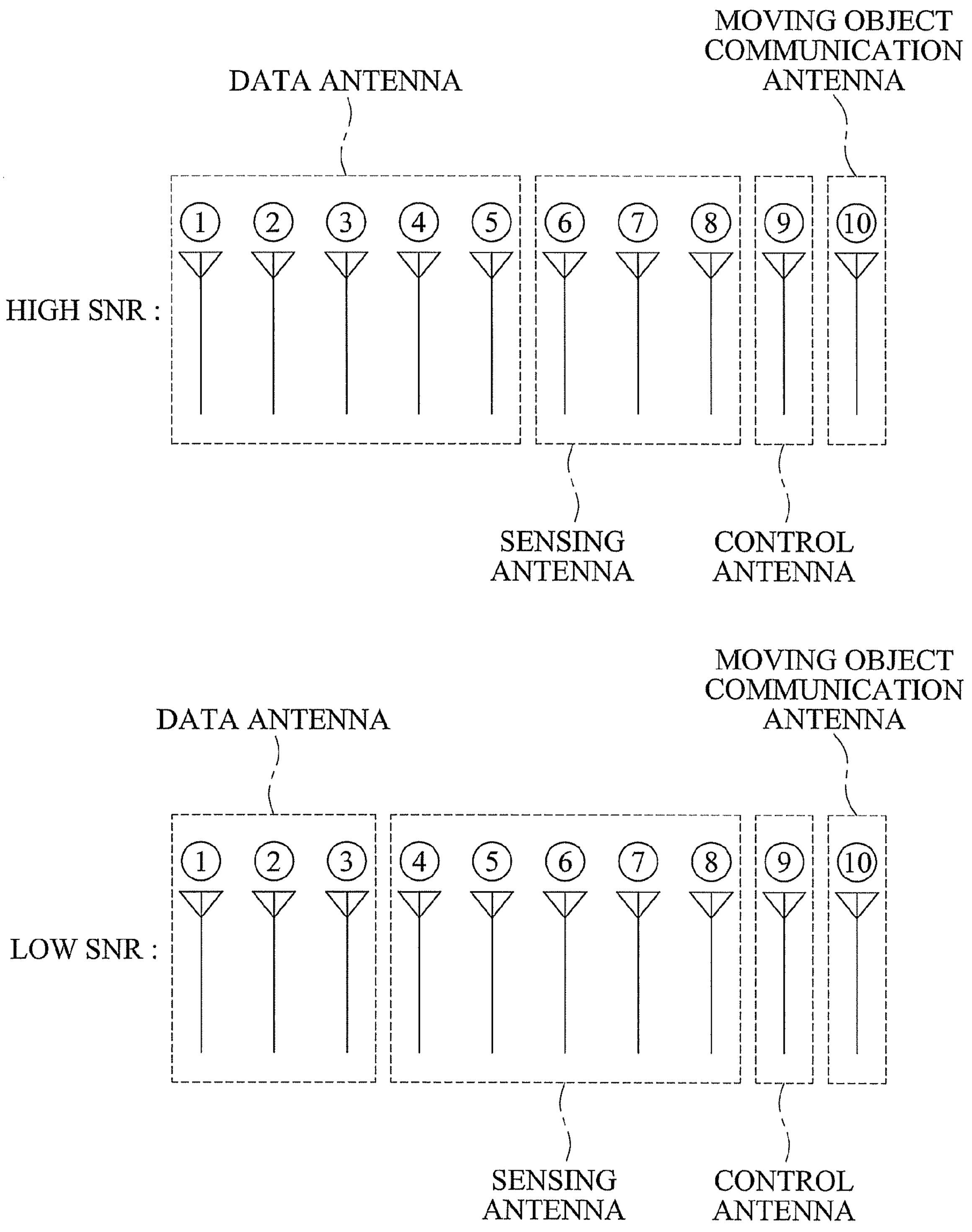
FIG. 3 is a diagram illustrating an example of determining a number of an antenna according to strength of a received signal.

FIG. 3 is a diagram illustrating an example of determining a number of an antenna according to strength of a received signal.

Referring to FIG. 3, it is illustrated that a number of an antenna changes according to each use, both when a received signal has a high signal to noise ratio (SNR), and when a received signal has a low SNR. Antennas (1), (2), (3), (4), (5), (6), (7), (8), (9), and (10) are communication antennas established in a moving object.

When the received signal has the high SNR, from the communication antennas, (1), (2), (3), (4), and (5) are determined as data antennas. Communication antennas (6), (7), and (8) are determined as sensing antennas, (9) is determined as a control antenna, and (10) is determined as a moving object communication antenna.

When the moving object is relatively far from a base station, an SNR of the received signal is decreased. In this instance, a number of sensing antennas is increased in order to rapidly and precisely detect an available frequency band, that is, (4), (5), (6), (7), and (8) communication antennas are determined as sensing antennas as illustrated in FIG. 3. A number of sensing antennas is three when the received signal has the high SNR, however the number of sensing antennas is five when the received signal has the low SNR.

Figure 4:
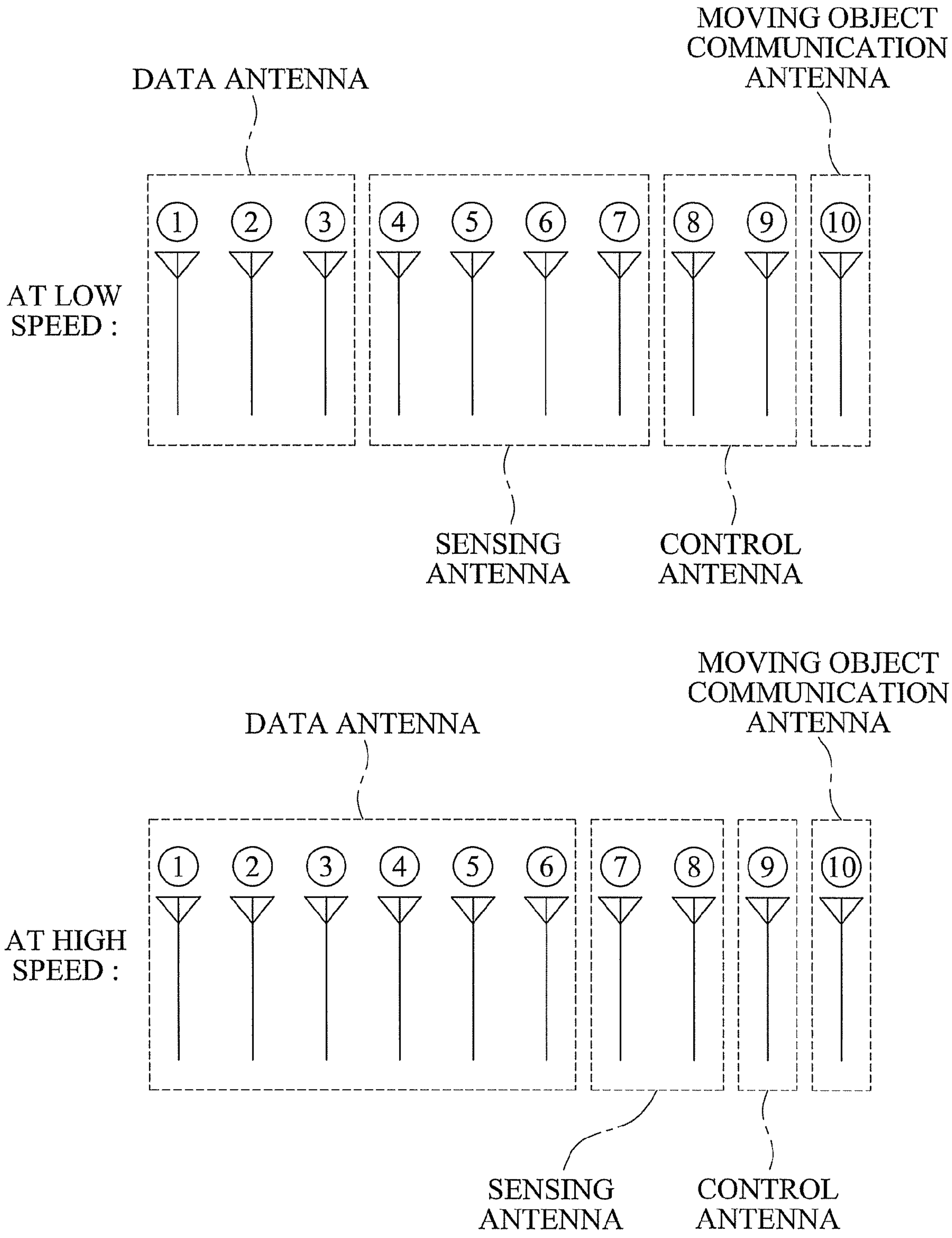
FIG. 4 is a diagram illustrating an example of determining a number of an antenna according to moving speed of a moving object.

FIG. 4 is a diagram illustrating an example of determining a number of antennas according to moving speed of a moving object.

Referring to FIG. 4, communication antennas (1), (2), (3), (4), (5), (6), (7), (8), (9), and (10) are established in a moving object.

In general, a data channel state where data is transmitted is normal when the moving object moves at low speed. Accordingly, a number of data antennas is three, and the communication antennas (1), (2), and (3) are determined as data antennas. Also, the communication antennas (4), (5), (6) and (7) are sensing antennas, the communication antennas (8) and (9) are control antennas, and the communication antenna (10) is a moving object communication antenna.

When the moving object moves at high speed, a data channel state is generally decreased. In this instance, a number of data antennas is increased by considering moving speed of the moving object. That is, the number of data antennas is increased from three to six, and the communication antennas (1), (2), (3), (4), (5), and (6) are determined as the data antennas.

In this instance, the communication antennas determined as the data antennas may transmit/receive data using a MIMO system, thereby achieving a higher data transmission rate.

The configurations determining the number of the sensing antenna and the number of the data antenna are described in detail from FIGS. 3 and 4. However, configurations determining a number of control antennas and a number of moving object communication antennas based on environmental information will be omitted in the specification since it has been described in detail with reference to FIGS. 1 and 2.

Figure 5:
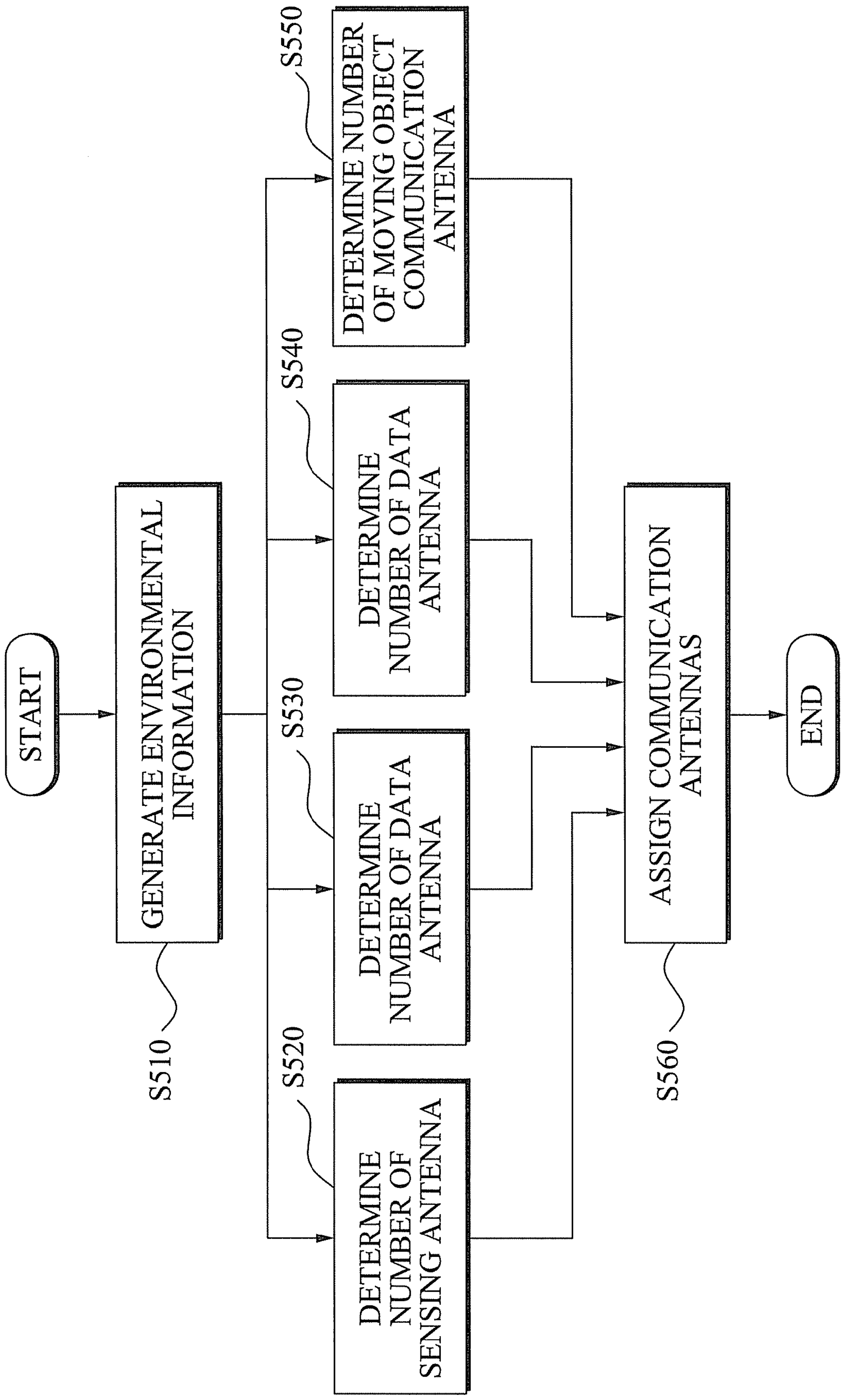
FIG. 5 is a flowchart illustrating an example of a method of controlling an antenna of a moving object.

FIG. 5 is a flowchart illustrating an example of a method of controlling an antenna of a moving object.

Referring to FIG. 5, an example of the method of controlling the antenna of the moving object generates environmental information which includes strength information of a received signal and moving speed information of a moving object where a plurality of communication antennas are established in operation S510.

An example of the method of controlling the antenna of the moving object determines a number of sensing antennas which detects an available frequency band from a plurality of communication antennas based on strength information of a received signal in operation S520.

In this instance, the operation S520 may increase the number of sensing antennas as strength of the received signal is decreased.

An example of the method of controlling the antenna of the moving object determines a number of data antennas which transmits/receives data from the plurality of communication antennas by considering moving speed information of a moving object in operation S530.

In this instance, the operation S530 may increase the number of data antennas as moving speed of the moving object is increased. In this instance, the data antenna may transmit/receive data using a MIMO system.

An example of the method of controlling the antenna of the moving object determines a number of control antennas which transmits/receives control information to control a data channel from the plurality of communication antennas, based on environmental information in operation S540.

In this instance, the control antenna may transmit/receive the control information using a MIMO system.

An example of the method of controlling the antenna of the moving object determines a number of moving object communication antennas for communication between moving objects from the plurality of communication antennas based on the environmental information in operation S550.

An example of the method of controlling the antenna of the moving object assigns the plurality of communication antennas for each use according to the determined number of antennas in operation S560.

Operation S560 may assign the plurality of communication antennas according to a predetermined priority order when a sum of the number of sensing antenna and the number of data antenna exceeds the number of communication antennas.

From the above description, operations S520, S530, S540, and S550 are performed in parallel. However, operations S520, S530, S540, and S550 may be serially or sequentially performed, and an operation order may be switched. As an example, when a number of an antennas established in a moving object is ten, after a number of a data antenna is determined to be six, from remaining four antennas, a number of sensing antennas, a number of control antennas, or a number of moving object communication antennas for communication between moving objects may be sequentially determined.

In FIG. 5, descriptions which are not described will be omitted in the specification since the descriptions have been described with reference to FIGS. 1 through 4.

The method of controlling an antenna of a moving object according to the above-described examples may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described examples.

According to examples described above, it is possible to effectively communicate since a number of antennas is determined for each use by considering strength information of a received signal and moving speed information of a moving object.

Also, according to examples described above, it is possible to effectively detect a frequency band by controlling a number of sensing antennas according to strength of a received signal.

Also, according to examples described above, it is possible to achieve a higher data transmission rate in a moving object moving at a high speed by determining a number of data antennas by considering moving speed information of the moving object.

Also, according to examples described above, it is possible to provide a higher quality communication service using a data antenna being capable of transmitting/receiving data using a MIMO system.

Also, according to examples described above, it is possible to effectively control a data channel by determining a number of control antennas according to surrounding environments.

Also, according to examples described above, it is possible to provide a more convenient communication service by determining a number of a moving object communication antenna for communication between moving objects according to surrounding environments of the moving object.

Although a few examples have been shown and described above, it would be appreciated by those skilled in the art that changes may be made to these examples without departing from the principles and spirit of the claims and their equivalents.

What is claimed is:

1. A communication system of a moving object, the moving object including a plurality of communication antennas configured to provide a plurality of communication services, the system comprising:

an environmental information generation unit configured to generate environmental information, the environmental information including strength information of a received signal and moving speed information of the moving object;

an antenna use determination unit configured to determine, with respect to the plurality of communication antennas, a number of the communication antennas for each of the communication services based on the environmental information, the antenna use determination unit comprising a sensing antenna determination unit and a data antenna determination unit, the sensing antenna determination unit being configured to determine a number of sensing antennas from the plurality of communication antennas based on the strength information, the sensing antennas being configured to detect an available frequency band, the data antenna determination unit being configured to determine a number of data antennas from the plurality of communication antennas based on the strength information, the data antennas being configured to transmit/receive data;

an antenna assigning unit configured to assign the plurality of communication antennas for each of the communication services according to the determined number of the communication antennas, assign the plurality of communication antennas according to the number of sensing antennas and the number of data antennas, and assign the plurality of communication antennas according to a predetermined priority order when a sum of the number of sensing antennas and the number of data antennas exceeds the number of the communication antennas.

2. The system of claim 1, wherein the sensing antenna determination unit is configured to increase the number of sensing antennas as a strength of the received signal decreases.

3. The system of claim 1, wherein the data antenna determination unit is configured to increase the number of data antennas as a speed of the moving object increases.

4. The system of claim 2, wherein the data antennas are configured to transmit/receive the data using a multiple-input multiple-output (MIMO) system.

5. The system of claim 1, wherein the antenna use determination unit further comprises a control antenna determination unit configured to determine a number of control antennas from the plurality of communication antennas based on the environmental information, the control antennas being configured to transmit/receive, and wherein the antenna assigning unit is configured to control the plurality of communication antennas according to the number of control antennas.

6. The system of claim 5, wherein the control antennas are configured to transmit/receive the control information using a multiple-input multiple-output (MIMO) system.

7. The system of claim 1, wherein the antenna usage determination unit further comprises a moving object communication antenna determination unit configured to determine a number of moving object communication antennas from the plurality of communication antennas based on the environmental information, the moving object communication antennas being configured for communication between moving objects, and wherein the antenna assigning unit is configured to assign the plurality of communication antennas according to the number of moving object communication antennas.

8. The system of claim 1, wherein the environmental information further comprises quality of service (QoS) information.

9. A communication method of a moving object, the moving object including a plurality of communication antennas to provide a plurality of communication services, the method comprising:

generating environmental information, comprising generating strength information of a received signal, and generating moving speed information of the moving object;

determining, with respect to the plurality of communication antennas, a number of the communication antennas for each of the communication services based on the environmental information, the determining of the number of the communication antennas for each of the communication services comprising determining a number of sensing antennas from the plurality of communication antennas based on the strength information, determining a number of data antennas from the plurality of communication antennas according to the moving speed information, the sensing antennas being configured to detect an available frequency band, the data antennas being configured to transmit/receive data; and assigning the plurality of communication antennas to each of the communication services according to the determined number of the communication antennas, the assigning of the plurality of communication antennas comprising assigning the plurality of communication antennas according to the number of sensing antennas and the number of data antennas, and assigning the plurality of communication antennas according to a predetermined priority order when a sum of the number of sensing antennas and the number of data antennas exceeds the number of the communication antennas.

10. The method of claim 9, wherein the determining of the number of sensing antennas comprises increasing the number of sensing antennas as a strength of the received signal decreases.

11. The method of claim 9, wherein the determining of the number of data antennas comprises increasing the number of data antennas as a speed of the moving object increases.

12. The method of claim 9, wherein the data antennas are configured to transmit/receive the data using a multiple-input multiple-output (MIMO) system.

13. The method of claim 9 wherein the determining of the number of the communication antennas for each of the communication services further comprises determining, based on the environmental information, a number of control antennas from the plurality of communication antennas, the control antennas being configured to transmit/receive control information to control a data channel, and wherein the assigning of the plurality of communication antennas further comprises assigning the plurality of communication antennas according to the number of control antennas.

14. The method of claim 13, wherein the control antennas are configured to transmit/receive the control information using a multiple-input multiple-output (MIMO) system.

15. The method of claim 9, wherein the determining of the number of the communication antennas for each of the communication services further comprises determining a number of moving object communication antennas from the plurality of communication antennas based on the environmental information, the moving object communication antennas being configured to communicate between moving objects, and wherein the assigning of the plurality of communication antennas further comprises assigning the plurality of communication antennas according to the number of moving object communication antennas.

16. A non-transitory computer-readable recording medium having stored thereon instructions for implementing the method of claim 9.

* * * * *